| | | | |
|---|---|---|---|
| | | United States Patent [19] | [11] 4,046,196 |
| | | Brown et al. | [45] Sept. 6, 1977 |

[54] SECONDARY OIL RECOVERY PROCESS

[75] Inventors: Alfred Brown; Stephen F. Hager, both of Houston, Tex.; Moutaz Chichakli, Dhahran, Saudi Arabia; Ching H. Wu, Golden, Colo.

[73] Assignee: Texaco Inc., New York, N.Y.

[21] Appl. No.: 668,016

[22] Filed: Mar. 18, 1976

[51] Int. Cl.$^2$ .............................................. E21B 43/22
[52] U.S. Cl. .................................. 166/273; 166/275; 252/8.55 D
[58] Field of Search ............................... 166/273–275, 166/305 R, 294, 295, 252; 252/8.55 D

[56] References Cited

U.S. PATENT DOCUMENTS

| | | | |
|---|---|---|---|
| 2,842,492 | 7/1958 | Englehardt et al. ............ | 252/8.55 D |
| 3,033,288 | 5/1962 | Holm ..................................... | 166/273 |
| 3,163,213 | 12/1964 | Bernard ................................ | 166/273 |
| 3,270,811 | 9/1966 | Meyer et al. ......................... | 166/273 |
| 3,482,631 | 12/1969 | Jones .................................... | 166/273 |
| 3,500,918 | 3/1970 | Holm .................................... | 166/273 |
| 3,589,443 | 6/1971 | Fisher ............................... | 166/292 X |

*Primary Examiner*—Stephen J. Novosad
*Attorney, Agent, or Firm*—Walter D. Hunter; Carl G. Ries; Thomas H. Whaley

[57] ABSTRACT

Oil is recovered from an oil-bearing subterranean formation penetrated by an injection well and a production well by injecting into the formation via the injection well a solution of a normally solid polymerized methacrylate and oil displaced by the injected solution is recovered from the formation via the production well. Optionally, after the solvent solution has been injected, a hydrocarbon slug such as crude oil, petroleum distillate, a soluble oil composition, etc. may be injected and, if desired, this may be followed by injection of water.

19 Claims, No Drawings

SECONDARY OIL RECOVERY PROCESS

BACKGROUND OF THE INVENTION

1. Field of the Invention

The invention relates to a method for recovering oil from an oil-bearing formation and more particularly relates to a method for recovering oil in which the oil is displaced from the formation by injecting a solution of a normally solid polymerized methacrylate such as an acetone solution of polymethyl methacrylate, and recovering the oil thus displaced from the formation.

2. Description of the Prior Art

Oil is normally recovered from subterranean formations in which it has accumulated by penetrating said formation with one or more wells and pumping or permitting the oil to flow to the surface through these wells. Recovery of oil from oil containing formations is possible only if certain conditions are satisfied. There must be an adequate concentration of oil in the formation, and there must be sufficient porosity and permeability or interconnected flow channel throughout the formation to permit the flow of fluids therethrough if sufficient pressure is applied to the fluid. When the subterranean petroleum containing formation has natural energy present in the form of an underlying active water drive, or gas dissolved in the petroleum which can exert sufficient pressure to drive the oil to the producing well, or a high pressure gas cap above the oil within the oil reservoir, this natural energy is utilized to recover oil. Recovery of oil by utilization of natural energy is referred to as primary recovery. When this natural energy source is depleted, or in the instance of those formations which do not originally contain sufficient natural energy to permit primary recovery operations, some form of supplemental recovery process must be utilized in order to exact oil from the subterranean petroleum containing formation. Supplemental recovery is frequently referred to as secondary recovery, although in fact it may be primary, secondary or tertiary in sequence of employment.

Water flooding, which involves the injection of water into the subterranean oil-bearing formation for the purpose of displacing oil toward the producing well, is the most economical and widely practiced supplemental recovery method. Water does not displace oil with high efficiency, however, since water and oil are immersible, and also because the interfacial tension between water and oil is quite high.

Another problem faced by those attempting to improve the efficiency of the water flood by the addition of hydrophilic polymeric materials has been the tendency of such polymer solutions to channel and to move prefrentially through portions of the formation which have been waterflooded and which are now essentially waterflooded. There is a definite need in the art for displacement fluids which will prevent such channeling effects.

SUMMARY OF THE INVENTION

This invention relates to a process for recovering oil from and oil-bearing formation penetrated by an injection well and a production well which comprises:

a. injecting into the formation via the said injection well a solution of a normally solid polymerized methacrylate in a water miscible solvent, and b. recovering from the formation oil displaced by the injected solution via the said production well. Optionally, after step (a) a hydrocarbon fluid can be injected via the injection well into the formation which may be followed, if desired, by injection via the injection well of an aqueous drive fluid which can be, for example, water or water thickened with a soluble polymer, i.e., a hydrophilic polymer such as polyacrylamide or a Kelzan type polymer, i.e., a polysaccharide type polymer.

As the solution of the polymerized methacrylate is injected into the formation some slight precipitation of the polymer may occur in the water zones or channels containing a residual oil saturation. The released polymer will decrease the mobility of the flood in this region and cause improvement in the sweeping efficiency of the flood.

A wide variety of normally solid polymerized methaacrylate polymers may be employed in preparing the polymer solutions of this invention. For example, polymerized methacrylates having recurring units of the formula:

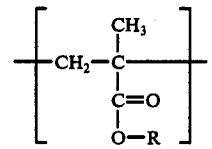

where R is alkyl of from 1 to about 5 or more carbon atoms may be advantageously utilized. Polymerized methyl-methacrylate which is commonly named by the tradename Lucite is a well-known, commercially available polymerized methacrylate suitable for use in preparing the polymer solutions of this invention.

The methacrylate solutions may be prepared utilizing any water miscible solvent which is effective to dissolve the polymerized methacrylate. Suitable solvents for dissolving the normally solid, polymerized methacrylate include glacial acetic acid, acetic anhydride, anhydrous propionic acid, etc. Other suitable solvents are the normally liquid aliphatic ketones such as acetone, methyl ethyl ketone and etc.

In carrying out the process of this invention the methacrylate solutions employed will generally comprise from about 0.01 to about 0.50 weight percent of the dissolved polymerized methacrylate.

In the practice of this invention from about 5 to about 120 pore volume percent of the solution of the normally solid polymerized methacrylate and, preferably, from about 10 to about 30 pore volume percent will be injected into the subterranean oil-bearing formation.

If a hydrocarbon fluid is injected into the formation after the normally solid polymerized methacrylate solution has been introduced into the formation a wide variety of materials can be employed such as kerosine, distillate fractions, crude oil, a soluble oil composition, etc.

The hydrocarbon fluid utilized in the process of this invention can comprise a soluble oil. Soluble oils as used herein are compositions possessing the ability to spontaneously emulsify when admixed with water. Such soluble oils generally comprise a liquid hydrocarbon, one or more selected surface active agents and a small amount of an alcohol such as secondary butyl alcohol. The emulsions formed by the addition of water to such soluble oils are the water-in-oil type in which water is dispersed in the oil in the form of very fine droplets. Such emulsions are generally transparent and or stable in that they remain as micro-emulsions on aging. At high water concentrations above the inversion concentration the emulsion inverts to an emulsion of an oil-in-water type in which the droplets of oil are dispersed in the continuous water phase. The liquid hydrocarbon employed in preparing these soluble oil compositions can be a crude petroleum oil such as crude oil previously recovered from the reservoir or any other available crude oil; a refined petroleum product such as gasoline, naphtha, diesel oil, etc. Preferably, the liquid hydrocarbon employed in the soluble oil composition will be of relative high boiling hydrocarbon having a boiling point of above 400° and preferably above 550° F. A wide variety of surface active materials may be employed in the soluble oil compositions but a specifically preferred class of materials are the oil soluble anionic surfactants such as the alkyl aryl sulfonates including alkyl aryl sulfonates prepared by sulfonation of aromatic petroleum fractions. The soluble oil compositions preferably will contain from about 30–75 volume percent of the liquid hydrocarbon from about 10–32 volume percent of the surface active agent and about 3–7 volume percent of secondary butyl alcohol.

The aqueous polymer solution, when employed as an injection fluid in the process of this invention, will contain from about 0.01 to about 0.50 weight percent of the hydrophilic polymer as exemplified by polyacrylamide, a microbial gum polysaccharide, such as Kelzan XC manufactured by the Kelco Corporation, San Diego, California or a partially hydrolyzed polyacrylamide sold under the tradename "Dow Pusher" manufactured by the Dow Chemical Company. Generally, from about 10 to about 30 pore volume percent or more of the aqueous solution will be injected into the formation. If desired, the aqueous polymer solution may be introduced into the formation as a tapered slug. For example, a slug of about 10 percent pore volume can be introduced at maximum concentration followed by a slug in which the polymer concentration is reduced to zero to give a total injected amount of, for example, 20 pore volume percent.

The following example, illustrates one method of operating the process of this invention and is to be considered not limitative.

EXAMPLE I

A subterranean, oil-containing limestone formation is found at a depth of 6230 ft. The limestone formation is 37 feet thick and porosity is about 28 percent. This field was first exploited by primary production utilizing a square grid pattern with 400 feet line spacing between the wells. At the conclusion of the primary recovery phase some 75 percent of original oil in place remains in the reservoir and water injection wells are drilled in the center of each square grid to convert the field to an inverted five-spot pattern for the water injection. Water flooding is carried out by injecting water into the injection well and the production of oil is continued from the production wells until the water-oil ratio reaches 30 which is considered to be on an economic limit for continued production from this field by water flooding. Only about 42 percent of the original oil in place in the reservoir is recovered at the conclusion of the water flooding operation.

In the next phase, the recovery process of this invention is put into operation. Since with the pattern employed a 70 percent sweep efficiency is obtained, in the first phase of the operation of this process a slug of about 130,000 cubic feet or ten percent volume of a solution of a polymerized isobutyl methacrylate in acetone (0.02 weight percent polymer) is injected into the formation through the injection well. Next there is injected through the injection well a slug of 75,000 gallons of kerosine following which a slug of 1 million gallons of hydrolyzed polyacrylamide, a hydrophilic polymer employed to increase the viscosity of the injected aqueous fluid to about 10 centipoises, is injected into the formation through the center injection well. In a final step, a water drive is conducted by injecting water into the formation and the displaced oil is moved through the formation toward the production wells. Water injection is continued until the water-oil ratio rises to about 30 at which point the residual oil saturation is reduced to about 13 percent pore volume and substantial quantities of oil are recovered during the final oil displacement process.

What is claimed is:

1. The process for recovering oil from an oil-bearing subterranean formation penetrated by an injection well and a production well which comprises:
    a. injection into the formation via the injection well a solution of a normally solid, polymerized methacrylate in a water miscible solvent, and
    b. recovering from the formation the oil displaced by the injected solution via the said production well, and wherein the said polymerized methacrylate is a homopolymer having recurring units of the formula:

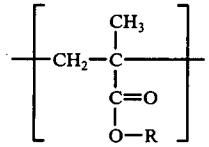

wherein R is alkyl of from 1 to about 5 carbon atoms.

2. The process of claim 1 wherein in (a) the said solvent is an aliphatic ketone.

3. The process of claim 1 wherein in (a) the said solvent is acetone.

4. The process of claim 1 wherein in (a) the said solvent is methyl ethyl ketone.

5. The process of claim 1 wherein the concentration of said polymerized methacrylate in the water miscible solvent is from about 0.01 to about 0.5 weight percent.

6. The process of claim 1 wherein the said polymerized methacrylate is polyisobutyl methacrylate.

7. A process for recovering oil from an oil-bearing subterranean formation penetrated by an injection well and a production well which comprises:
    a. injecting into the formation via the said injection well a solution of a normally solid polymerized methacrylate in a water miscible solvent;
    b. injecting into the formation via the said injection well a hydrocarbon fluid,
    c. injecting into the formation via the injection well a solution of a water-soluble polymer, and
    d. recovering from the formation oil displaced via the said production well, and wherein the said polymerized methacrylate is a homopolymer having recurring units of the formula:

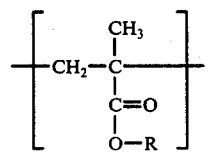

wherein R is alkyl of from 1 to about 5 carbon atoms.

8. The process of claim 7 wherein after step (d) water is injected into the formation.

9. The process of claim 7 wherein in step (a) a solution of polyisobutyl methacrylate is employed.

10. The process of claim 7 wherein in step (a) a solution of polymethyl methacrylate in acetone is employed.

11. The process of claim 7 wherein in step (c) a solution of partially hydrolyzed acrylamide is employed.

12. The process of claim 7 wherein in step (b) the said hydrocarbon is kerosine.

13. The process of claim 7 wherein in step (b) the said hydrocarbon is crude oil.

14. The process of claim 7 wherein the said hydrocarbon fluid in (b) is a soluble oil composition.

15. The process of claim 7 wherein the said hydrocarbon fluid in (b) comprises about 30 to 75 volume percent of a liquid hydrocarbon, about 10 to 32 volume percent of a surface active agent and about 3 to 7 volume percent of secondary butyl alcohol.

16. The process of claim 15 wherein the said surface active agent is dodecyl benzene sulfonate.

17. The process of claim 7 wherein in (a) the said solvent is a ketone.

18. The process of claim 7 wherein in (a) the said solvent is acetone.

19. The process of claim 7 wherein in (a) the said solvent is methyl ethyl ketone.

* * * * *